(12) United States Patent
Prestwich et al.

(10) Patent No.: US 9,746,545 B1
(45) Date of Patent: Aug. 29, 2017

(54) MONOPULSE ARBITRARY PHASE DETECTION AND REMOVAL

(71) Applicant: L3 Technologies, Inc., New York, NY (US)

(72) Inventors: Sy Prestwich, Riverton, UT (US); Jeffrey B Bench, Lehi, UT (US); Richard A McNamee, Salt Lake City, UT (US); Scott M. Lyon, South Weber, UT (US)

(73) Assignee: L3 Technologies, Inc., New York, NY (US)

( * ) Notice: Subject to any disclaimer, the term of this patent is extended or adjusted under 35 U.S.C. 154(b) by 283 days.

(21) Appl. No.: 14/572,470

(22) Filed: Dec. 16, 2014

(51) Int. Cl.
*G01S 13/44* (2006.01)
*G01S 7/285* (2006.01)
*G01S 13/02* (2006.01)

(52) U.S. Cl.
CPC ............. *G01S 7/285* (2013.01); *G01S 13/02* (2013.01)

(58) Field of Classification Search
CPC .................................. G01S 7/285; G01S 13/02
USPC .................................. 342/149–152, 383–384
See application file for complete search history.

(56) References Cited

U.S. PATENT DOCUMENTS

| | | | |
|---|---|---|---|
| 5,063,529 A * | 11/1991 | Chapoton | H01Q 3/267 342/174 |
| 8,994,581 B1 * | 3/2015 | Brown | G01S 13/931 342/127 |
| 2008/0030395 A1 * | 2/2008 | Knick | G01S 3/325 342/80 |
| 2010/0075618 A1 * | 3/2010 | Isaji | G01S 13/345 455/90.1 |
| 2012/0133548 A1 * | 5/2012 | Schneider | G01S 7/4026 342/149 |
| 2013/0127655 A1 * | 5/2013 | Kishigami | G01S 7/288 342/152 |

(Continued)

*Primary Examiner* — Marcus Windrich
(74) *Attorney, Agent, or Firm* — Workman Nydegger

(57) ABSTRACT

Systems and method for detecting and removing an arbitrary phase difference between a sum channel signal and a difference channel signal in a monopulse system. A sum channel signal is received from a sum channel signal source and a difference channel signal is received from a difference channel signal source. The difference channel signal is shifted according to various potential arbitrary phase differences $\phi_i$ and $\phi_i + \pi$ (where $\phi_i$ is from 0 to $\pi$ radians, i=0, 1, ..., n; $\phi_i + \pi$ going from $\pi$ to $2\pi$ radians) between the sum and difference channel signals to thereby generate difference channel signals each having a different phase. The difference channels having a different phase are combined with the sum channel signal to generate a plurality of sum+difference signals and sum−difference signals. Based on the plurality of sum+difference signals and sum−difference signals, maximum in-phase and out-of-phase correlations are determined from the $\phi_i$ and $\phi_i + \pi$ pairs. The maximum in-phase and out-of-phase correlation pairs are used in an error estimate calculation.

21 Claims, 10 Drawing Sheets

(56) References Cited

U.S. PATENT DOCUMENTS

2014/0347212 A1* 11/2014 Tuxen ................. G01S 13/4454
                                                                       342/147

* cited by examiner

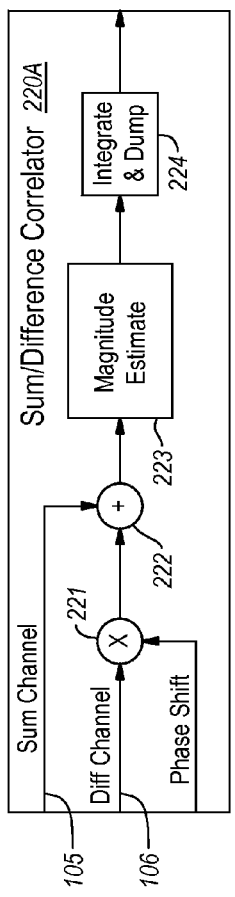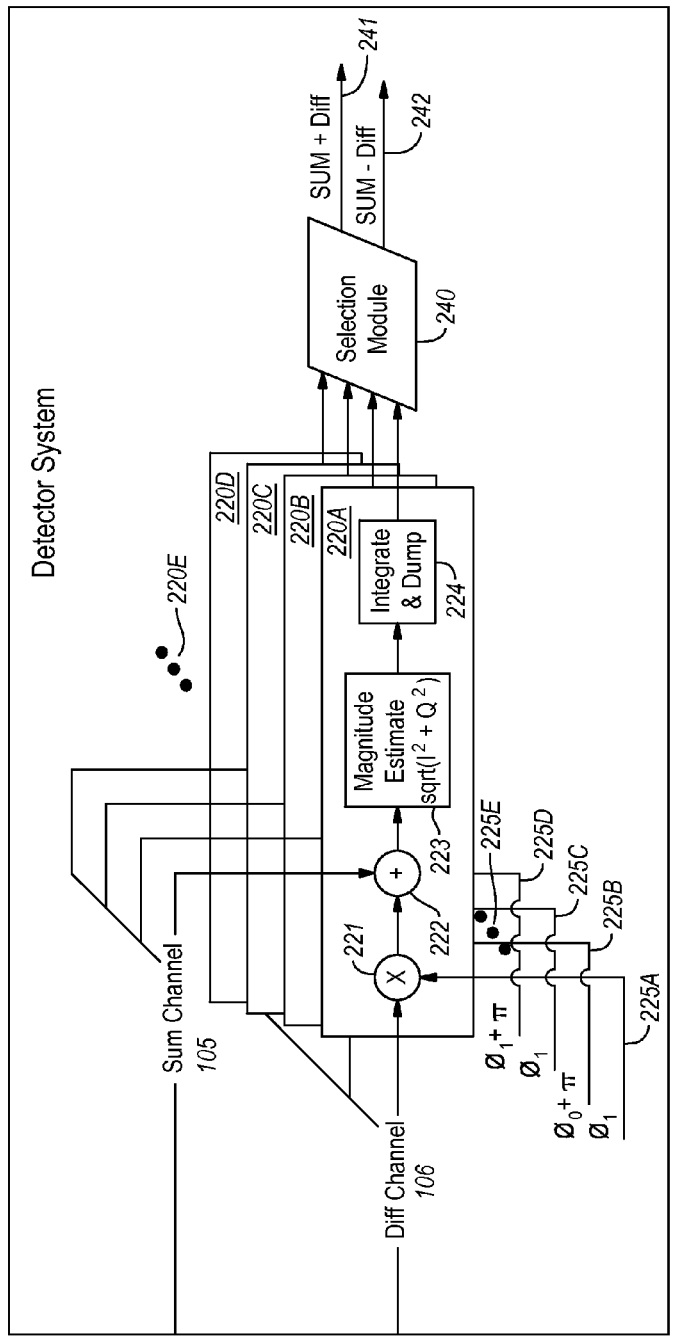
FIG. 4A
FIG. 4B

MONOPULSE ARBITRARY PHASE DETECTION AND REMOVAL

BACKGROUND

Background and Relevant Art

Monopulse tracking is a multi-channel technique to provide azimuth and elevation error estimates for tight antenna tracking requirements. A typical monopulse tracking system includes a sum channel signal (summation of RF signals from a feed/comparator) and one or more difference channel signals (subtraction of RF signals from the feed/comparator). The sum channel signal and the one or more difference channel signals provide received data to various signal processing systems that are used to calculate the azimuth and elevation error estimates.

Typical monopulse tracking systems, however, suffer phase mismatches between the sum channel signal and the one or more difference channel signals. For instance, the sum and difference channel signals may provide the signal processing systems with different phases due to component phase mismatches and mismatched transmission path lengths in the RF circuitry used to down covert the sum and difference channel signals. In addition, the phase response of the feed/comparator introduces non-ideal time-varying phase mismatches between channels as the antenna position changes relative to the target. The resulting phase mismatch between the sum channel signal and a difference channel signal is called the "arbitrary phase difference" and must be removed to improve antenna tracking performance.

Monopulse tracking systems typically require tight phase matching in their RF circuitry to overcome phase mismatches between the sum and difference channels. Such systems require unreasonably tight component and RF path phase matching tolerances, complex and time consuming calibration over frequency and temperature, and suffer degradations in their monopulse detection transfer functions resulting in tracking errors and longer pull-in times.

Other monopulse detection implementations ignore the non-ideal phase response inherent in monopulse feed/comparator waveguide structures across azimuth and elevation. The phase response of the feed/comparator can deviate rapidly from ideal as the antenna position changes over time relative to the target In traditional monopulse antenna tracking systems, maintaining phase matching at RF frequencies is critical to achieving good tracking accuracy. This is very difficult to achieve for tight antenna tracking requirements, especially at Ka frequencies and above. In addition, variations over frequency and temperature cause additional phase mismatches. Previous designs must tolerate greater phase mismatches across frequency and temperature and require significant time and money to calibrate for proper operation to be within the appropriate tolerances.

Unless otherwise indicated herein, the materials described in this section are not prior art to the claims in this application and are not admitted to be prior art by inclusion in this section. Rather, this background is only provided to illustrate one exemplary technology area where some embodiments described herein may be practiced.

BRIEF SUMMARY

One embodiment disclosed herein relates a method for detecting and removing an arbitrary phase difference between a sum channel signal and a difference channel signal. The method includes receiving a sum channel signal from a sum channel signal source and receiving a difference channel signal from a difference channel signal source. The difference channel signal is shifted according to various potential phase difference pairs $\phi_i$ and $\phi_i+\pi$ (where $\phi_i$ is from 0 to $\pi$ radians, i=0, 1, . . . , n; $\phi_i+\pi$ going from $\pi$ to $2\pi$ radians) between the sum and difference channel signals to thereby generate difference channel signals each having a different phase across $2\pi$. The difference channels having a different phase are correlated with the sum channel signal to generate a plurality of sum+difference signals and sum−difference signals. Based on the plurality of sum+difference signals and sum−difference signals, the maximum in-phase and out-of-phase correlation magnitude difference between the $\phi_i$ and $\phi_i+\pi$ pairs are determined. The maximum in-phase and out-of-phase correlation difference (the $\phi_i$ and $\phi_i+\pi$ pairs) are used in an error estimate calculation that removes the arbitrary phase difference.

Another embodiment disclosed herein is related to an arbitrary phase detector for use in a monopulse tracking system. The detector includes a first input that receives a sum channel signal from the monopulse tracking system and a second input that receives a difference channel signal from the monopulse tracking system. The detector also includes one or more sum/difference correlators that are each coupled to the first and second inputs. Each sum/difference correlator includes a multiply block that receives the difference channel signal and one of a potential arbitrary phase difference pair $\phi_i$ and $\phi_i+\pi$ and shifts the difference signal channel according to the one of the potential arbitrary phase differences to thereby generate a phase shifted difference channel signal. Each sum/difference correlator also includes an add block that combines the phase shifted difference channel signal with the sum channel signal to produce a correlation with one of a sum+difference channel signal or one of a sum−difference channel signal. Each sum/difference correlator also includes a magnitude estimator block that determines a magnitude of the sum+difference signal or the sum−difference signal. The detector also includes a selection block coupled to the sum/difference correlators that determines the sum+difference signal corresponding to a maximum correlation magnitude from the $\phi_i$ phase-shifted difference channel and the sum−difference signal corresponding to a maximum correlation magnitude $\phi_i+\pi$ phase-shifted difference channel. The detector also includes a processor block that uses the sum+difference signal corresponding to the maximum correlation magnitude from the $\phi_i$ phase-shifted difference signal and the sum−difference signal corresponding to the maximum correlation magnitude from the $\phi_i+\pi$ phase-shifted difference channel in an error estimate calculation.

Another embodiment disclosed herein is related to a monopulse tracking system. The system includes a feed/combiner which includes two or more feed antennas and two or more combiners. The two or more combiners combine signals received from the two or more feed antennas to generate a sum channel signal and at least one difference channel signal. The system also includes a Radio Frequency (RF) detector assembly that is coupled to the feed/combiner and that receives the sum channel signal and at the least one difference channel signal. The RF detector assembly performs down conversion on the sum channel signal and at the least one difference channel signal and converts the signals into digital signals. The system also includes a digital arbitrary phase detector that is coupled to the RF detector assembly. The digital arbitrary phase detector receives the digital sum channel signal from the RF detector assembly, receives the digital at least one difference channel signal from the RF detector assembly; shifts the at least one difference channel signal according to a plurality of potential arbitrary phase difference pairs $\phi_i$ and $\phi_i+\pi$ between the sum and difference channel signals to thereby generate a plurality of difference channel signals each having a different phase, combines the plurality of difference channel signals each having a different phase with the sum channel signal to generate a plurality of sum+difference signals and sum–difference signals; determines, based on the plurality of sum+difference signals and sum–difference signals, a maximum correlation magnitude for the $\phi_i$ and $\phi_i+\pi$ pairs, and uses the maximum correlation magnitudes from the $\phi_i$ and $\phi_i+\pi$ pairs in an error estimate calculation These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 4A and 4B illustrate example sum/difference correlators according to the embodiments disclosed herein;

DETAILED DESCRIPTION

Figure 1:
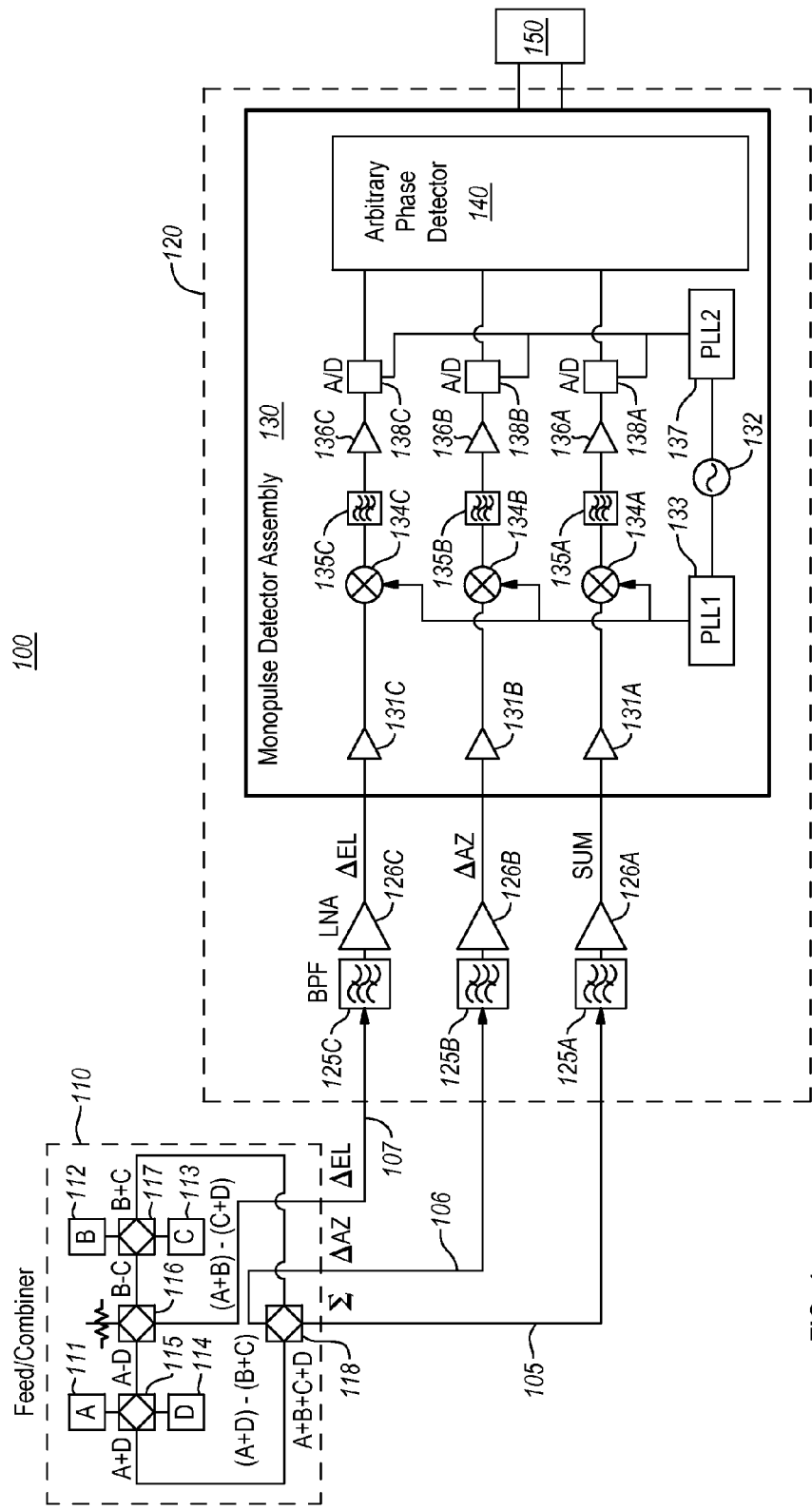
FIG. 1 illustrates an example monopulse tracking system according to the embodiments disclosed herein.

This application is generally directed towards systems and method for detecting and removing arbitrary phase differences between sum and difference channel signals of monopulse tracking systems and other similar systems.

Typical monopulse tracking systems are implemented using Radio Frequency (RF) hardware. The RF hardware receives a sum channel signal and a difference channel signal from a feed/combiner system. The RF hardware then power combines the sum channel signal and the difference channel signal to generate a sum+difference signal and a sum–difference signal. The sum+difference signal ideally represents the sum channel signal combined with a difference channel signal at 0 degrees in phase. The sum–difference signal ideally represents the sum channel signal combined with a difference channels signal that is 180 degrees out of phase with the difference channel signal used in the sum+difference signal.

The RF hardware may then determine the magnitude of the sum+difference signal during a first discrete time period and the magnitude of the sum–difference signal during a second discrete time period. The magnitudes are compared and are used to determine if any error correction is needed to steer the antenna system so that it may properly track a desired target.

These typical systems, however, require that the phase between the sum and difference channel remain accurate and stable. That is, the phase difference needs to be close to 0 degrees and 180 degrees so that the target tracking or antenna angular error correction using the sum+difference signal and the sum–difference signals is accurate. If the phase differences become too large, the systems will not work. For example, if the phase difference is 90 degrees, the system will not show any target tracking error and if it is greater than 90 degrees, then the system may track the wrong way.

Unfortunately, typical monopulse tracking systems are susceptible to phase drift that causes unacceptable arbitrary phase differences. For example, phase difference may be caused by differences in the RF hardware of the system or may be caused by changes in environmental conditions such as temperature change, vibrations caused by the wind, or other changes in the position of the tracking system. In addition, the movement of the antenna as it tracks a target may also introduce unacceptable arbitrary phase differences. Further changes in operational parameters such as changes in tracking frequency may also introduce unacceptable arbitrary phase differences.

To correct for unacceptable arbitrary phase differences, many typical monopulse tracking systems must use very precise and expensive RF hardware that is resistant to phase drift. In addition, the system must constantly be calibrated to correct for phase drift.

In addition, typical monopulse tracking systems may often be slow in making necessary error corrections. As described above, typical monopulse tracking systems use two or more discrete time periods when determining the magnitude of the sum+difference signal and the sum–difference signal. Often, the use of the discrete time periods does not allow the system to adjust quickly enough to changes in a target that is being tracked.

In addition, since the typical monopulse tracking system uses the two or more discrete time periods, such system may be subject to channel coherence problems. For example, in some instances the magnitude of the sum+difference signal and the sum–difference signal during a first discrete time period will be determined to be one value. However, during a second discrete time period, the sum channel signal and/or the difference channel signal may change for the reasons discussed above. Accordingly, the magnitude of the sum+difference signal and the sum–difference signal determined during the second discrete time period may be different. Thus, the ratio between the magnitudes of the signals during the two time periods may include error, which may introduce further error into the tracking system. Said another way, because a different RF signal is used during each of the discrete time periods to evaluate the magnitude of the sum+difference signal and the sum–difference signal, additional error may be introduced. Advantageously, the principles of the present invention provide methods and systems that are able to evaluate a number of potential arbitrary phase differences in parallel substantially simultaneously or at discrete time. This allows for the detection of and the subsequent removal of the actual arbitrary phase differences in a quick manner.

In the embodiments disclosed herein, an arbitrary phase detector is implemented in digital hardware such as an FPGA. Accordingly, the detector is not implemented by RF hardware.

The arbitrary phase detector includes a number of sum/difference correlators. Each of the sum/difference correlators receive a sum channel signal and one or both of an azimuth difference channel signal and an elevation difference channel signal. Each of the sum/difference correlators also receive one of a number of potential arbitrary phase differences that might exist between the sum and difference channel signals at a given period of time. The potential arbitrary phase differences may include one of a phase $\phi_i$ or its conjugate $\phi_i+\pi$, where i=0, 1, 2 ... n, with $\phi_i$ ranging from 0 to $\pi$ radians, and d+$\pi$ ranging from $\pi$ to $2\pi$ radians. In some embodiments, n may equal a large number or it may equal a small number depending on system resources and design criteria.

Each of the sum/difference correlators shifts the difference channel signal by the received phase $\phi_i$ or $\phi_i+\pi$ and combines the shifted signal with the sum channel signal to generate one of a sum+difference signal or a sum−difference signal. The magnitude of the sum+difference signals or the sum−difference signals are evaluated over the same given time period in each of the sum/difference correlators to determine a maximum magnitude correlation from the $\phi_i$ signals and a maximum magnitude correlation from $\phi_i+\pi$ signals, which are likely to correspond to actual arbitrary phase difference and it's $\pi$ conjugate. The maximum $\phi_i$ correlated magnitude and a maximum $\phi_i+\pi$ correlated magnitude are then used in error calculations. This process will be described in detail to follow.

The principles of the present invention provide significant advances over existing monopulse tracking systems. For instance, since the arbitrary phase detector is able to evaluate a number of potential arbitrary phase differences at the same time for a given time period, phase drift in the system during operation is no longer a big problem. That is, since the potential arbitrary phase differences that are simultaneously evaluated will likely include the actual phase differences, the system will already have the information it needs to remove phase drift as it occurs during operation due to RF hardware or environmental conditions. This will in turn remove the need for constant calibration or for expensive parts that are resistant to phase drift. This will also allow the system to more quickly perform error calculations and to adjust the tracking of the system.

In addition, since the potential arbitrary phase differences in some embodiments are all simultaneously evaluated in parallel, the system is able to have low latency and faster response times when compared to typical monopulse tracking systems. For example, since some of the embodiments disclosed herein do not use discrete time periods during the evaluation, but use the same time period for all potential arbitrary phase differences, the embodiments disclosed herein are faster than typical monopulse tracking systems.

Further, since the potential arbitrary phase differences in some embodiments are all simultaneously evaluated in parallel, the same RF signal is used when evaluating the magnitude of the sum+difference signals and the sum−difference signals. This helps to prevent the channel coherence issues previously described.

Attention is now given FIG. 1, which illustrates an example monopulse tracking system 100 according to the embodiments disclosed herein. As will be appreciated after reading this description, the embodiment shown in FIG. 1 is only one of many different ways to implement a monopulse tracking system. Accordingly, the embodiments disclosed herein are not limited to the embodiment shown in FIG. 1.

As illustrated, FIG. 1 includes a feed/combiner 110. The feed/combiner 110 includes various receive or feed antennas A (111), B (112), C (113), and D (114). The receive or feed antennas 111-114 may be any reasonable antennas such as horn antennas that are configured to work in a monopulse tracking system. In one embodiment, the receive or feed antennas 111-114 may be four feed horns symmetrically offset from a focus point of a reflector. In other embodiments there may be only two feed horns implemented as the feed/combiner 110.

The feed/combiner 110 also includes various combiners 115-118. The combiners 115-118 may be any reasonable RF combiners or the like that are able to combine the signals received by the antennas 111-114. In one embodiment, the combiners 115-118 may be hybrid junctions such as a Magic-T, a hybrid ring junction, or a 3-dB directional coupler. It will be understood that the embodiments disclosed herein are not limited by the type of combiners 115-118 that are implemented.

In operation, the receive or feed antennas 111-114 receive signals from a target. The signals are then feed to the combiners 115-118. For example, feed antenna A (111) and feed antenna D (114) feed their respective signals to combiner 115 while feed antenna B (112) and feed antenna C (113) feed their respective signals to combiner 117. The combiners 115 and 117 add or subtract the signals that are received and provide the results to combiners 116 and 118. These combiners further add or subtract the signals to produce a sum channel signal 105 and two difference channel signals 106 and 107.

As illustrated, the sum channel signal 105 comprises the summation of all the received antenna signals A+B+C+D. The azimuth difference channel signal 106 comprises (A+D)−(B+C) and the elevation difference channel signal 107 comprises (A+B)−(C+D). It will be understood that in embodiments with only two feed horn antennas, only the sum and one difference channel signal will be generated.

The monopulse tracking system 100 also includes a receiver 120 that receives the sum channel signal 105, the azimuth difference channel signal 106 and the elevation difference channel signal 107 and provides down conversion and other processing of the signals. In some embodiments, only one of the difference channel signals may be received by the receiver 120. This may be a single axis implementation.

The receiver 120 includes various Radio Frequency (RF) front end processing elements as needed. For example, in the embodiment illustrated in FIG. 1, a band pass filter 125A, 125B, and 125C provide filtering for the sum channel signal 105, the azimuth difference channel signal 106 and the elevation difference channel signal 107. The filtered signals are then further amplified by low noise amplifiers 126A, 126B, and 126C. It will be understood that the receiver 120 may include additional or different RF front end processing elements as circumstances warrant.

The receiver 120 further includes a monopulse detector assembly 130. It will be understood that the monopulse detector assembly 130 may include more or less than the elements illustrated in FIG. 1. Accordingly, the embodiments disclosed herein are not limited to any type of monopulse detector assembly.

As illustrated, the monopulse detector assembly 130 includes various RF electrical elements that provide further processing on the sum channel signal 105, the azimuth difference channel signal 106 and the elevation difference channel signal 107. For example, amplifiers 131A, 131B, and 131C provide further amplification on the signals. Mixers 134A, 134B, and 134C mix the signals with a local oscillation signal 132 in conjunction with a phased locked loop (PLL) 133 to provide down conversion to the signals. Filters 135A, 135B, and 135C and amplifiers 136A, 136B, and 136C provide further filtering and amplification to the signals 105, 106, and 107 as needed.

Analog-to-digital converters (A/D) 138A, 138B, and 138C convert the sum channel signal 105, the azimuth difference channel signal 106 and the elevation difference channel signal 107 from analog signals to digital signals. In addition, a phase locked loop (PLL) 137 may provide additional down conversion and processing in conjunction with the local oscillator 132.

As illustrated, the monopulse detector assembly 130 includes an arbitrary phase detector 140. The arbitrary phase detector 140 may be implemented in a Field Programmable Gate Array (FPGA) in one embodiment. In other embodiments, the arbitrary phase detector 140 may be implemented in other digital hardware or software. Accordingly, the embodiments disclosed herein are not limited by the manner in which the arbitrary phase detector 140 is implemented.

As will be explained in more detail to follow, the arbitrary phase detector 140 is configured to detect or determine a maximum correlation difference or delta between the sum channel signal 105 and the azimuth difference channel signal 106 and a maximum correlation difference or delta between the sum channel signal 105 and the elevation difference channel signal 107. The maximum correlation difference or delta is then used to select a magnitude of a sum+difference signal and a sum−difference signal for the azimuth channel and/or the elevation channel that may be used to help steer the monopulse tracking system 100, as will also be explained in more detail to follow. As is known, a sum−difference signal is 180 degrees out of phase with the sum+difference signal. Accordingly, the sum+difference signal may be considered an in-phase or constructive summation and the sum−difference signal may be considered an out-of-phase summation or destructive summation.

Accordingly, the monopulse tracking system 100 also includes tracking system steering control unit 150. The tracking system steering control unit 150 receives error correction data from the arbitrary phase detector 140 and uses this data to physically steer one or more antennas of the monopulse tracking system 100 in the desired direction. For example, the error correction data may be used to control azimuth adjustment circuitry or elevation adjustment circuity in the control unit 150 that adjust the azimuth and/or elevation of an antenna that is part of the monopulse tracking system 100.

Figure 2:
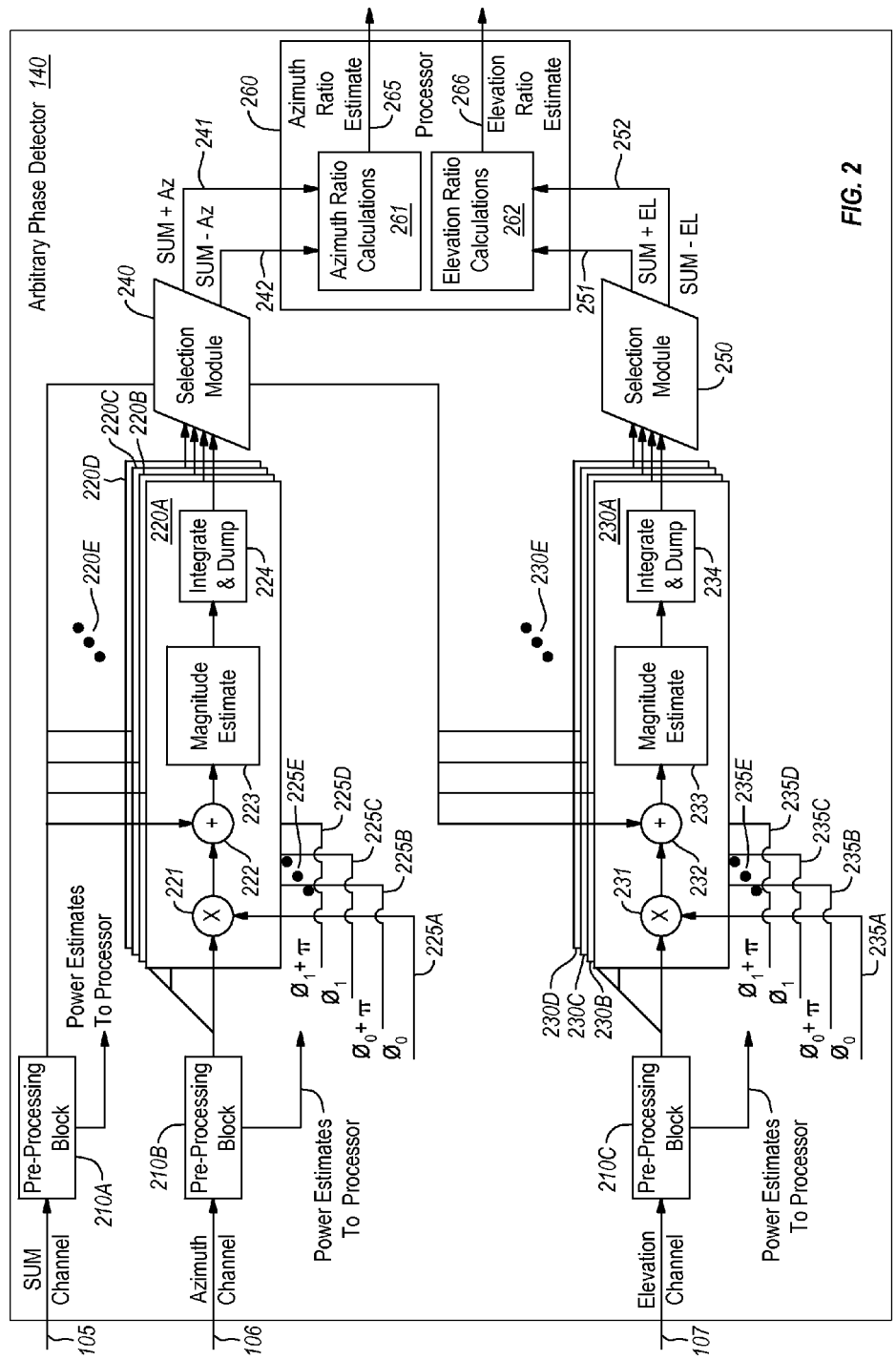
FIG. 2 illustrates an example arbitrary phase detector according to the embodiments disclosed herein.

FIG. 2 illustrates an example embodiment of the arbitrary phase detector 140 previously described. As will be appreciated, the various elements of the arbitrary phase detector 140 are for illustration only and are not intended to be limiting. Accordingly, the arbitrary phase detector 140 may include more or less than the elements shown in FIG. 2.

As illustrated, the arbitrary phase detector 140 receives the sum channel signal 105, the azimuth difference channel signal 106 and the elevation difference channel signal 107 from the analog-to-digital converters (A/D) 138A, 138B, and 138C as previously described. The sum channel signal 105 is received by a pre-processing block 210A, the azimuth difference channel signal 106 is received by a pre-processing block 210B, and the elevation difference channel signal 107 is received by a pre-processing block 210C. In operation, the pre-processing blocks 210 are configured to perform further down conversion and filtering on the received signals so that the signals are useable by other elements of the arbitrary phase detector 140.

Although FIG. 2 shows both the azimuth difference channel signal 106 and the elevation difference channel signal 107 being received by the arbitrary phase detector 140, this need not always be the case. In some embodiments, the arbitrary phase detector 140 may only receive one of the azimuth difference channel signal 106 and the elevation difference channel signal 107. Accordingly, the embodiments disclosed herein contemplate embodiments where only one difference channel is received and evaluated in the manner to be described below.

Figure 3:
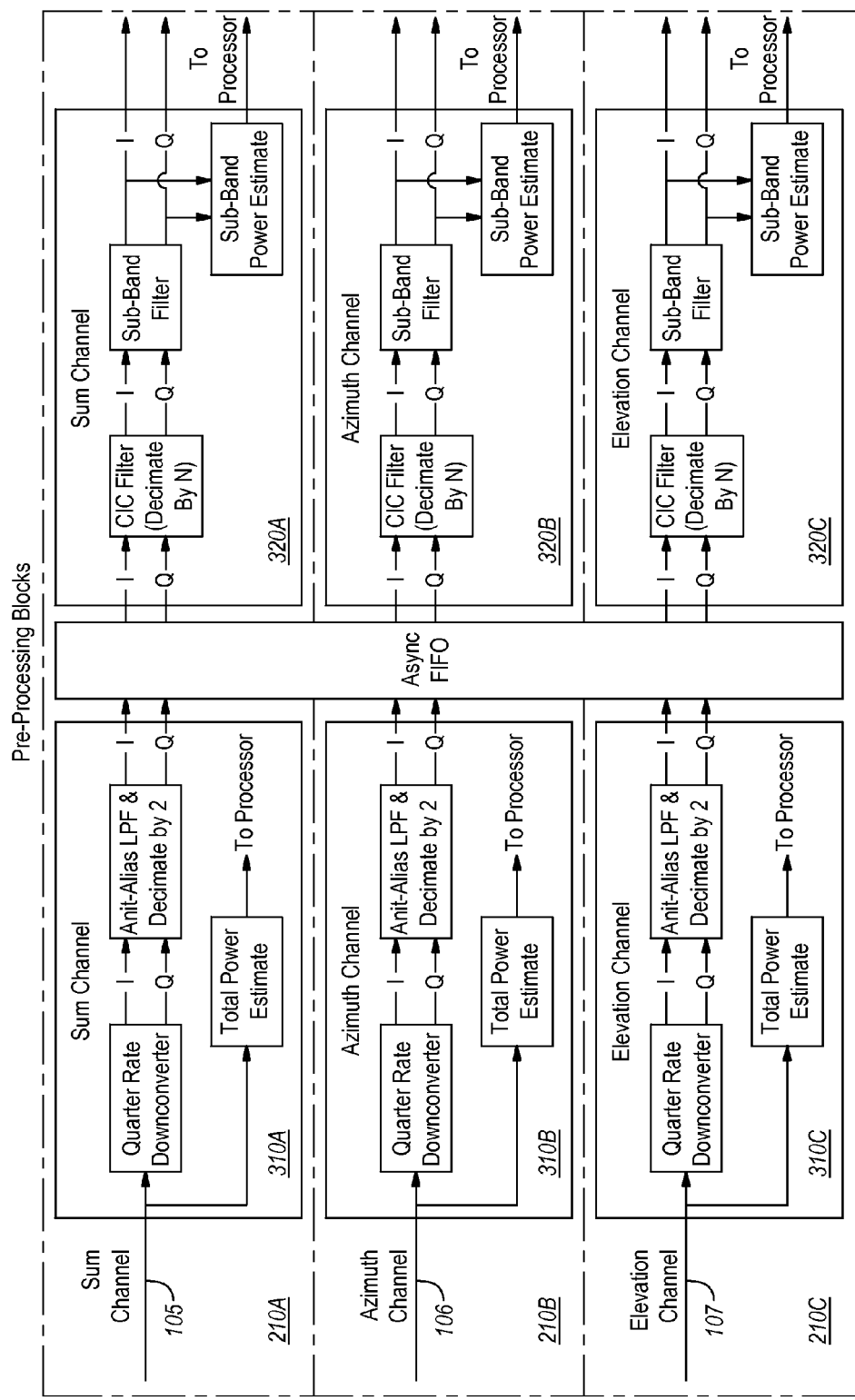
FIG. 3 illustrates example pre-processing blocks according to the embodiments disclosed herein.

FIG. 3 illustrates an example embodiment of the pre-processing blocks 210A-210C. As illustrated, each of the pre-processing blocks 210 includes a down conversion block 310 (illustrated as 310A, 310B, and 310C) that provides further down conversion of the respective signal received at the block. The down conversion blocks 310 may also provide a power estimate to a processor block 260 of the arbitrary phase detector 140. In some embodiments, for example when phase shift-key modulation is used, the down conversion blocks 310 may generate both in-phase (I) and quadrature phase (Q) versions of the various signals 105, 106, and 107 as is illustrated in FIG. 3. It will be understood, however, that in other embodiments there will be no need to generate the I and Q signals. Accordingly, the embodiments disclosed herein contemplate both embodiments that implement I and Q signals and those that have single versions of the signals.

The pre-processing blocks 210A-210C may also include a filtering block 320 (illustrated as 320A, 320B, and 320C) that provides further filtering to the various signals 105, 106, and 107. In the illustrated embodiment, the filtering is performed on the I and Q signals. It will be understood that the filter blocks 320 may include any reasonable filter that is designed to provide the necessary filtering.

Returning to FIG. 2, it is illustrated that the arbitrary phase detector 140 includes a first set of sum/difference correlators 220 that receive the azimuth difference channel signal 106 from the pre-processing block 210B and the sum channel signal 105 from the pre-processing block 210A. The first set of sum/difference correlators 220 includes sum/difference correlators 220A, 220B, 220C, and 220D. The ellipses 220E represents that there can be any number of additional sum/difference correlators 220 as circumstances warrant. As will be explained in more detail to follow, in some embodiments the number of sum/difference correlators 220 may be determined by a number of potential arbitrary phase differences between the sum and difference channels that are to be evaluated in parallel substantially simultaneously.

FIGS. 4A and 4B illustrate an enhanced view of the first set of sum/difference correlators 220A, 220B, 220C, 220D and ellipses 220E representing any number of additional sum/difference correlators 220. As illustrated, each of the sum/difference correlators 220 receives the azimuth difference channel signal 106 at a multiply block 221. The multiply block 221 also receives one of a number of potential arbitrary phase differences 225A, 225B, 225C, 225D, between the sum channel signal and the difference channel signal, with the ellipses 225E representing any number of additional potential arbitrary phase differences. As previously described, the sum channel signal and one or both of the difference channel signals may present at the sum/difference correlator different phases due to component mismatch in the receiver 120 and/or due to phase mismatches as the monopulse tracking system 100's position changes relative to the target. These potential phase differences are evaluated in parallel substantially simultaneously by each of the sum/difference correlators 220 and other elements of the arbitrary phase detector 140 as will now be explained.

As will be appreciated, the number of potential arbitrary phase differences that are to be evaluated in parallel substantially simultaneously may be different in different embodiments as circumstances warrant. For example, in some embodiments system resources may dictate that only a small number of potential arbitrary phase differences be evaluated in parallel while in other embodiments system resources may allow for a large number of potential arbitrary phase differences to be evaluated in parallel, thus providing more resolution to the final result. Accordingly, the embodiments disclosed herein are not limited by the number of potential arbitrary phase differences that are evaluated in parallel substantially simultaneously. For example, there may be two, four, eight, 16, or 32, etc. potential different arbitrary phase differences that are evaluated in parallel substantially simultaneously in various embodiments. In other embodiments, more or less than these numbers of potential different arbitrary phase differences may be evaluated.

Figure 4C:
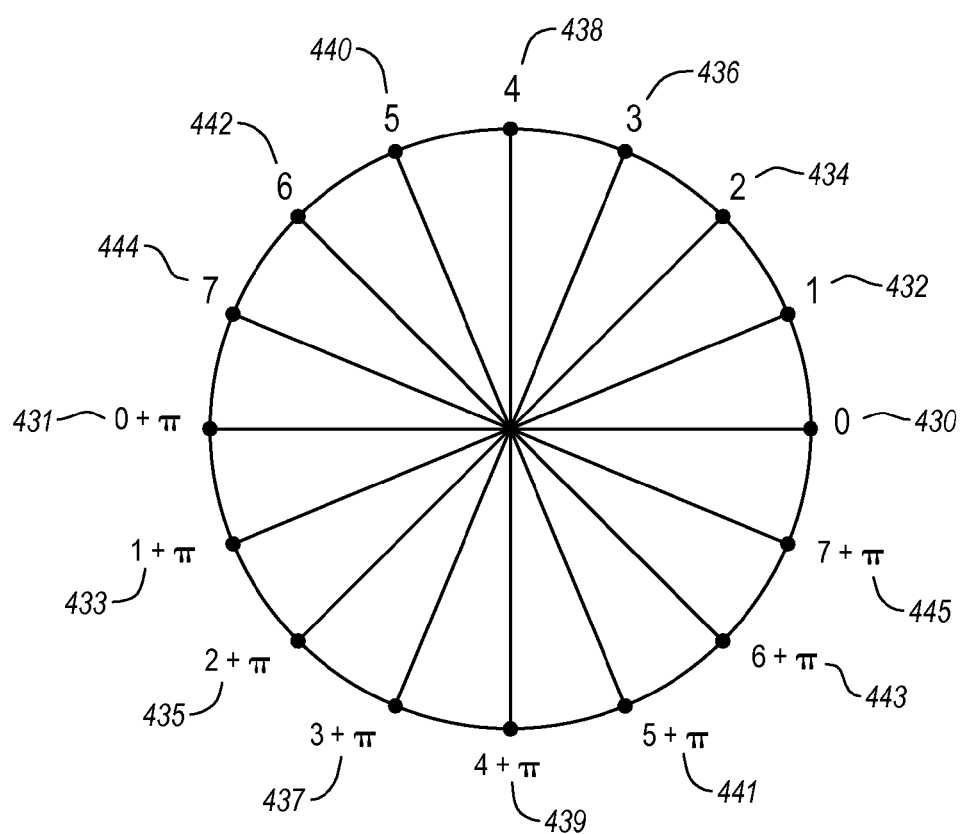
FIG. 4C illustrates potential arbitrary phase differences according to the embodiments disclosed herein.

In one embodiment, illustrated in FIG. 4C, the potential arbitrary phase differences may be determined as phase pairs across a window of $2\pi$ as $\phi_i$ and $\phi_i+\pi$, wherein $\phi_i$ is from 0 to $\pi$ radians and $\phi_i+\pi$ is from it to $2\pi$ radians and where i=0, 1, 2, ... n. In the embodiment illustrated in FIG. 4C, n=7 for a total of 16 phases that are 22.5 degrees apart across $2\pi$. For example, a first potential arbitrary phase difference pair may be $\phi_0$ (430) and $\phi_0+$(431), a second potential arbitrary phase difference pair may be $\phi_1$ (432) and $\phi_1+\pi$ (433), a third potential arbitrary phase difference pair may be $\phi_2$ (434) and $\phi_2+\pi$ (435), a fourth potential arbitrary phase difference pair may be $\phi_3$ (436) and $\phi_3+\pi$ (437), a fifth potential arbitrary phase difference pair may be $\phi_4$ (438) and $\phi_4+\pi$ (439), a sixth potential arbitrary phase difference pair may be $\phi_5$ (440) and $\phi_5+\pi$ (441), a seventh potential arbitrary phase difference pair may be $\phi_6$ (442) and $\phi_6+\pi$ (443), and an eighth potential arbitrary phase difference pair may be $\phi_7$ (444) and $\phi_7+\pi$ (445).

Returning to FIG. 4B, if the total number of potential arbitrary phase differences to be evaluated in parallel substantially simultaneously is as discussed in FIG. 4C, then there would be 16 different sum/difference correlators 220 implemented. Each one of the sum/difference correlators 220 may receive a different potential arbitrary phase difference at the multiply block 221. For example, the multiply block 221 of the sum/difference correlator 220A may receive an arbitrary phase difference of $\phi_0$ (225A, 430), the multiply block 221 of the sum/difference correlator 220B may receive an arbitrary phase difference of $\phi_0+\pi$ (225B, 431), the multiply block 221 of the sum/difference correlator 220C may receive an arbitrary phase difference of $\phi_1$ (225C, 432), the multiply block 221 of the sum/difference correlator 220D may receive an arbitrary phase difference of $\phi_1+\pi$ (225D, 433), and so on until all 16 of the sum/difference correlators 220 have each received a different potential arbitrary phase difference.

The multiply blocks 221 of the various sum/difference correlators 220 multiply the respective potential arbitrary phase difference 225 with the received azimuth difference channel signal 106. This produces 16 versions of the azimuth difference channel signal 106 that are phased shifted according to the respective potential arbitrary phase difference 225.

The phase shifted azimuth difference channels 106 are then fed to an add block 222 that combines or correlates the phase shifted signals with the sum channel signal 105. For example, the add block 222 of the sum/difference correlator 220A may correlate the sum channel signal 105 with the azimuth difference signal 106 that has been shifted by the potential arbitrary phase difference $\phi_0$ (430) to generate a sum+difference signal. Likewise, the sum/difference correlator 220B may correlate the sum channel signal 105 with the azimuth difference signal 106 that has been shifted by potential arbitrary phase difference $\phi_0+\pi$ (431) to generate a sum−difference signal. In similar manner, the remaining sum/difference correlators 220 may also combine or correlate the sum channel signal 105 with the azimuth difference signal 106 that has been shifted to produce a sum+difference signal for potential arbitrary phase differences 432, 434, 436, 438, 440, 442 and 444 and a sum−difference signal for potential arbitrary phase differences 433, 435, 437, 439, 441, 443, and 445.

As illustrated, each of the sum/difference correlators 220 may also include a magnitude estimator block 223 and a time integration block 224. In operation, the correlated sum+difference signals and correlated sum−difference signals may be fed to the magnitude estimator blocks 223 of each of the sum/difference correlators 220. The magnitude estimator blocks 223 may estimate a power magnitude of the correlated sum+difference signals and sum−difference signals over a given time or integration period. It will be appreciated that number of sum+difference samples and sum−difference samples that are correlated during the integration period will be determined, in part, by the sampling rate of the arbitrary phase detector 140.

The time integration blocks 224 of each of the sum/difference correlators 220 may specify the given time or integration period over which the magnitude estimator blocks 223 estimate the power magnitude for each of the signals. It will be understood that the length of the integration period may be different in different embodiments based on design considerations and the like. For example, in one embodiment the integration period may be 4 ms while in other embodiments the integration period may be more or less than 4 ms due to the design objectives of the system. As will be appreciated a longer integration period may allow for a better estimate of the power magnitude, but at the cost of updating the monopulse tracking system 100 less often. Accordingly, the embodiments disclosed herein are not limited by any given integration period.

Figure 4D:
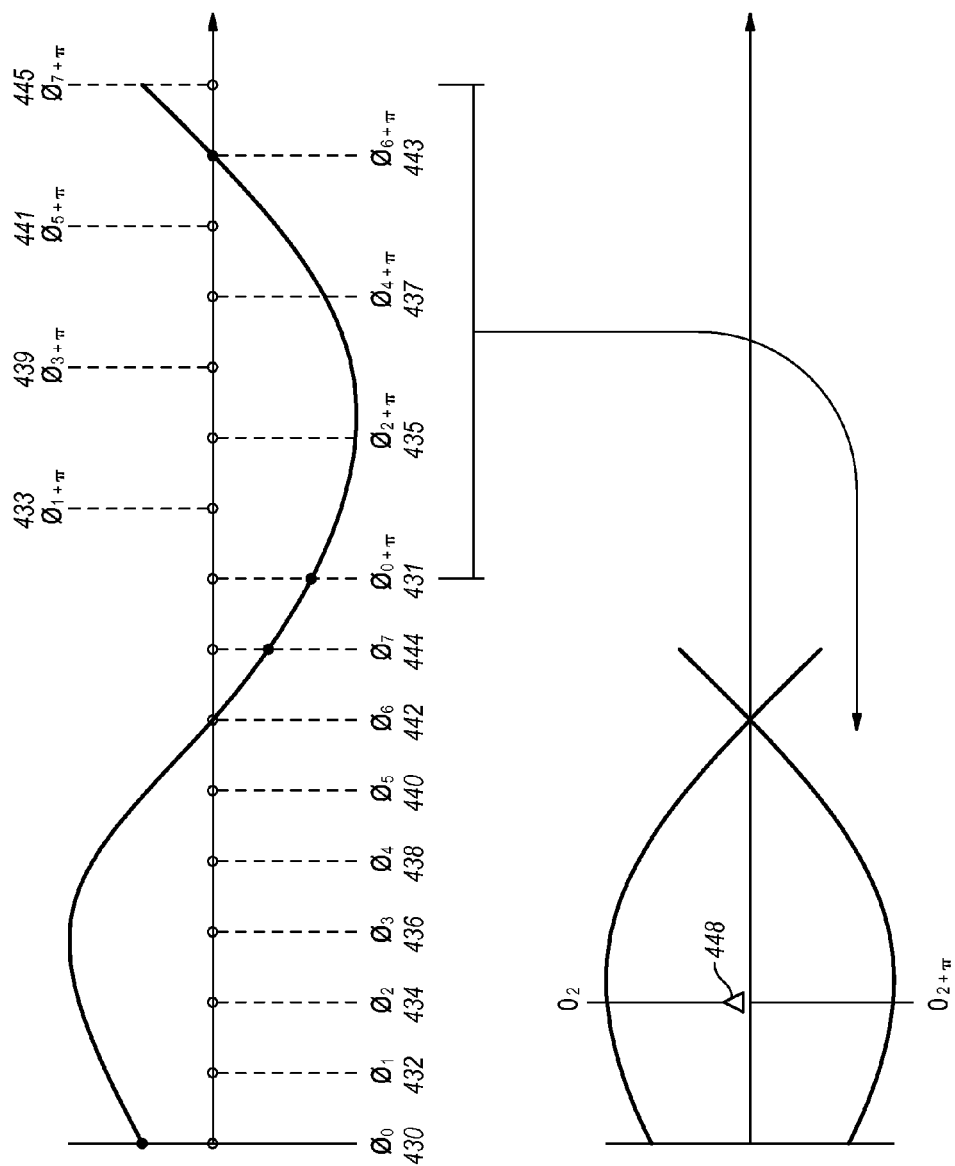
FIG. 4D illustrates how the correlation magnitudes of $\phi_i$ and $\phi_i+\pi$ pairs line up to calculate a maximum difference according to the embodiments disclosed herein.

FIG. 4D illustrates a visual example of the power magnitude of the correlated sum+difference signals and correlated sum−difference signals for each potential arbitrary phase difference over the integration period. As illustrated, FIG. 4D shows that the power magnitudes create a sine-like wave as a result of the correlation being performed over $2\pi$. In addition, the FIG. 4D shows a phase pair $\phi_i$ and $\phi_i+\pi$ that produces a maximum correlation magnitude difference as will be explained in more detail to follow.

Advantageously, having the magnitudes evaluated for all 16 signals in parallel substantially at the same time in the sum/difference correlators 220 provides a significant increase in the speed of the system when compared to conventional monopulse systems that provide evaluations for the different signals during discrete time periods. That is, since the evaluations are done at the same time, the embodiments disclosed herein are able to correct for any phase differences every integration period if needed. This in turn allows the embodiments disclosed herein to keep up with antenna position changes, which increases system tracking performances.

Returning to FIG. 2, it is illustrated that in some embodiments the arbitrary phase detector 140 also includes a second set of sum/difference correlators 230 that receive the elevation difference channel signal 107 from the pre-processing block 210C and the sum channel signal 105 from the pre-processing block 210A. The second set of sum/difference correlators 230 includes sum/difference correlators 230A, 230B, 230C, and 230D. The ellipses 230E may represent that there may be any number of additional sum/difference correlators 230 as circumstances warrant. As explained above in relation to sum/difference correlators 220, in some embodiments the number of sum/difference correlators 230 may be determined by the number of potential arbitrary phase differences between the sum and difference channels that are to be evaluated in parallel substantially simultaneously. Accordingly, in the embodiment of FIG. 2, there are 16 sum/difference correlators 230.

As illustrated, the sum/difference correlators 230 each include a multiply block 231, an add block 232, a magnitude estimator block 233 and an integration block 234 that may correspond to those previously described in relation to sum/difference correlators 220 and thus need not be described in further detail. Accordingly, the sum/difference correlators 230 may process and evaluate the potential arbitrary phase differences 235A, 235B, 235C, 235D, and ellipses 235E (representing any number of additional potential arbitrary phase differences) in the manner previously described for sum/difference correlators 220.

As further illustrated in FIG. 2, the sum/difference correlators 220 are coupled to a selection module 240. In operation the sum/difference correlators 220 read out the estimated correlation magnitudes of the correlated sum+difference signals and correlated sum−difference signals to the selection module 240 at the end of each integration period. The selection module 240 then determines the sum+difference signal and the sum−difference signal corresponding to the phase pair $\phi_i$ and $\phi_i+\pi$ which produces the maximum correlation magnitude difference.

Returning to FIG. 4D, the bottom portion of the figure shows how the selection module 240 determines the phase pair $\phi_i$ and $\phi_i+\pi$ which produces the maximum correlation magnitude difference or delta. As illustrated, the power magnitudes from $\pi$ to $2\pi$ are flipped 180 degrees and are shown with the power magnitudes from 0 to $\pi$. Thus, the magnitude difference for each phase pair $\phi_i$ and $\phi_i+\pi$ is visually shown. The phase pair with the maximum correlation difference will be the pair that are the furthest apart from each other, in other words the pair with the largest delta. In the embodiment of FIG. 4D, it can be seen that the phase pair phase pair $\phi_2$ and $\phi_2+\pi$ has the maximum correlation difference as these two pairs are furthest apart on the graph as illustrated at 448.

Said another way, the magnitude of the sum+difference signal corresponding to a maximum in-phase correlation from the $\phi_i$ phase shift will be the maximum on the sine-like wave shown in FIG. 4D, which in the embodiment corresponds to $\phi_2$. The magnitude of the sum−difference signal corresponding to a maximum out-of-phase correlation from the $\phi_i+\pi$ phase shift will be the minimum shown on the sine-like wave of FIG. 4D, which in the embodiment corresponds to $\phi_2+\pi$.

Figure 5:
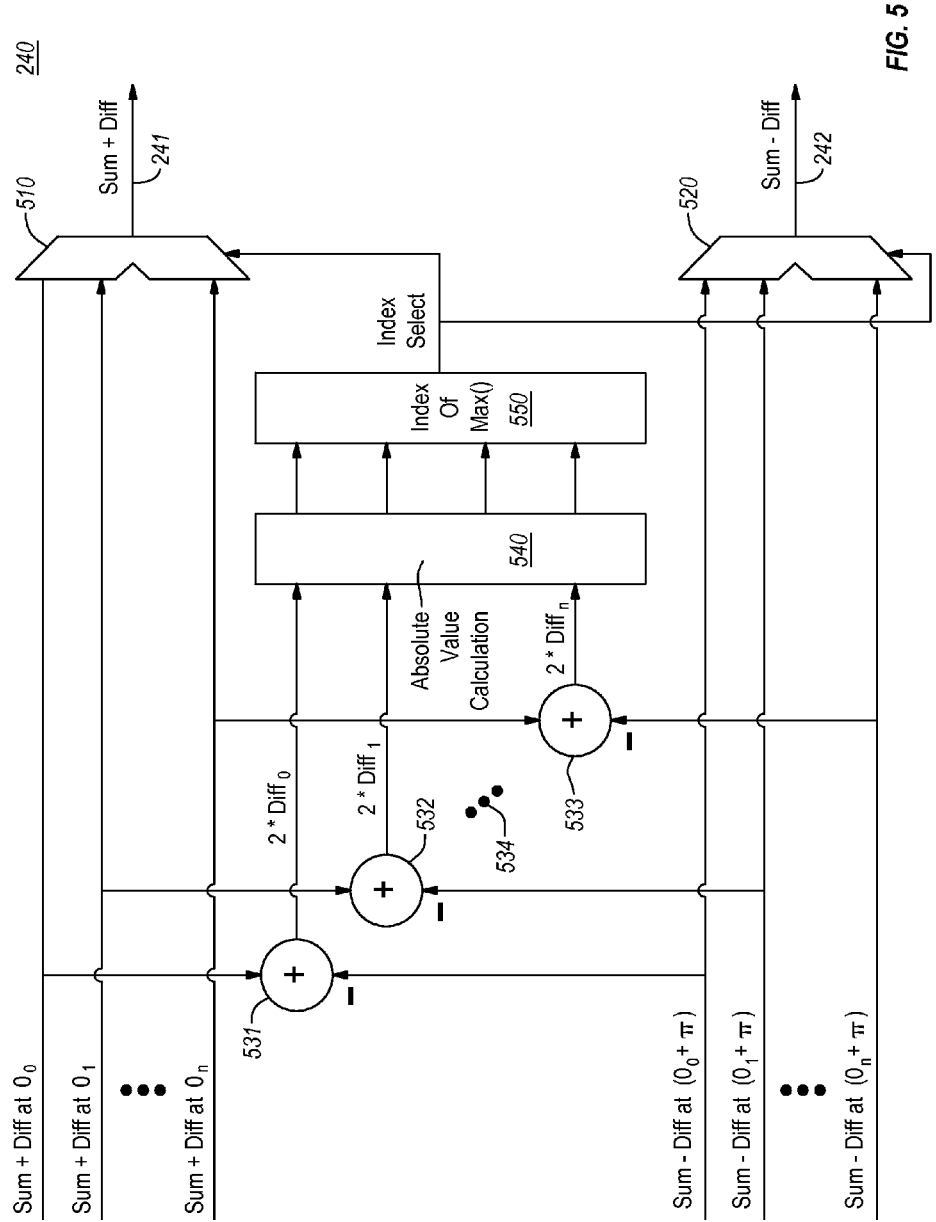
FIG. 5 illustrates an example selection module according to the embodiments disclosed herein.

FIG. 5 illustrates one embodiment of the selection module 240. As with the other embodiments described herein, the embodiment of FIG. 5 is only one of many potential embodiments of the selection module 240. Accordingly, the embodiment of FIG. 5 is not limiting to the embodiments disclosed herein.

As illustrated, the embodiment of FIG. 5 includes a multiplexer 510 that receives all of the sum+difference signals from the sum/difference correlators 220. A multiplexer 520 receives all of the sum−difference signals from the sum/difference correlators 220.

The selection module 240 of FIG. 5 further includes a number of add blocks 531, 532, 533, and any number of potential add blocks as illustrated by ellipses 534 that correspond to the number of received sum+difference signals and the sum−difference signals. In the embodiment of the arbitrary phase detector 140 of FIG. 2, there may be 16 add blocks that correspond to the received 16 sum+difference signals and the sum−difference signals. In operation, the add blocks 531, 532, 533, and 534 combine the received sum+difference signals and the negative of the sum−difference signals to produce an output related to twice the magnitude of the difference signals.

The difference signals are then provided to an absolute value block 540, which removes the sign of the estimate so that the index of max block 550 can easily determine the maximum difference or delta between the sum+difference and sum−difference magnitude estimates. The index of max block 550 determines the sum+difference signal having the magnitude corresponding to the phase difference $\phi_i$ and the corresponding sum−difference signal having the magnitude corresponding to the phase difference $\phi_i+\pi$. The index block 550 also provides an index select to the multiplexers 510 and 520, which specify which of the sum+difference signal having the magnitude corresponding to the phase difference $\phi_i$ and the corresponding sum−difference signal having the magnitude corresponding to the phase difference $\phi_i+\pi$ will be passed for further processing as indicated by 241 and 242.

Returning to FIG. 2, the sum/difference correlators 230 are coupled to a selection module 250. In operation the sum/difference correlators 230 read out the estimated correlation magnitudes of the sum+difference signals and sum−difference signals to the selection module 250 at the end of the integration period. The selection module 250 may then determine the sum+difference signal magnitude and the sum−difference signal magnitude corresponding to the phase pair $\phi_i$ and $\phi_i+\pi$ having the largest correlation difference in the manner previously described in relation to selection module 240. In this way, the selection module 250 is able to determine the potential phase pair that is most likely to remove the actual arbitrary phase difference of the sum and elevation difference channel signals 105 and 107 received by the arbitrary phase detector 140. The sum+difference signal magnitude corresponding to the arbitrary phase difference $\phi_i$ and the corresponding sum−difference magnitude signal corresponding to the arbitrary phase difference $\phi_i+\pi$ will be passed for further processing as indicated by 251 and 252.

The arbitrary phase detector 140 further includes a processor block 260 that receives the signals 241 and 242 from the selection 240 and the signals 251 and 252 from the selection module 250 as illustrated in FIG. 2. The processor block 260, which may be any reasonable processor block, is configured to use the signals 241, 242, 251, and 252 which have removed any arbitrary phase difference prior to performing azimuth tracking error correction operations and elevation tracking error correction operations. These tracking error correction operations may determine error correction values or estimations that specify how much the monopulse tracking system 100, specifically antennas of the system, should be steered or otherwise adjusted to correctly track any targets or the like the system is tracking.

In one embodiment, the processor block 260 may include an azimuth ratio calculation block 261 and an elevation ratio calculation block 262. In operation, the blocks 261 and 262 may be configured to use the signal 241, 242, 251, and 252 to calculate a difference to sum ratio that may then be used to determine azimuth ratio estimates and elevation ratio estimates. The azimuth ratio estimate 265 and the elevation estimate 266 may then be provided to tracking system steering control unit 150, where the estimates are used to help physically steer the antennas and other hardware of the monopulse tracking system 100.

Figure 6:
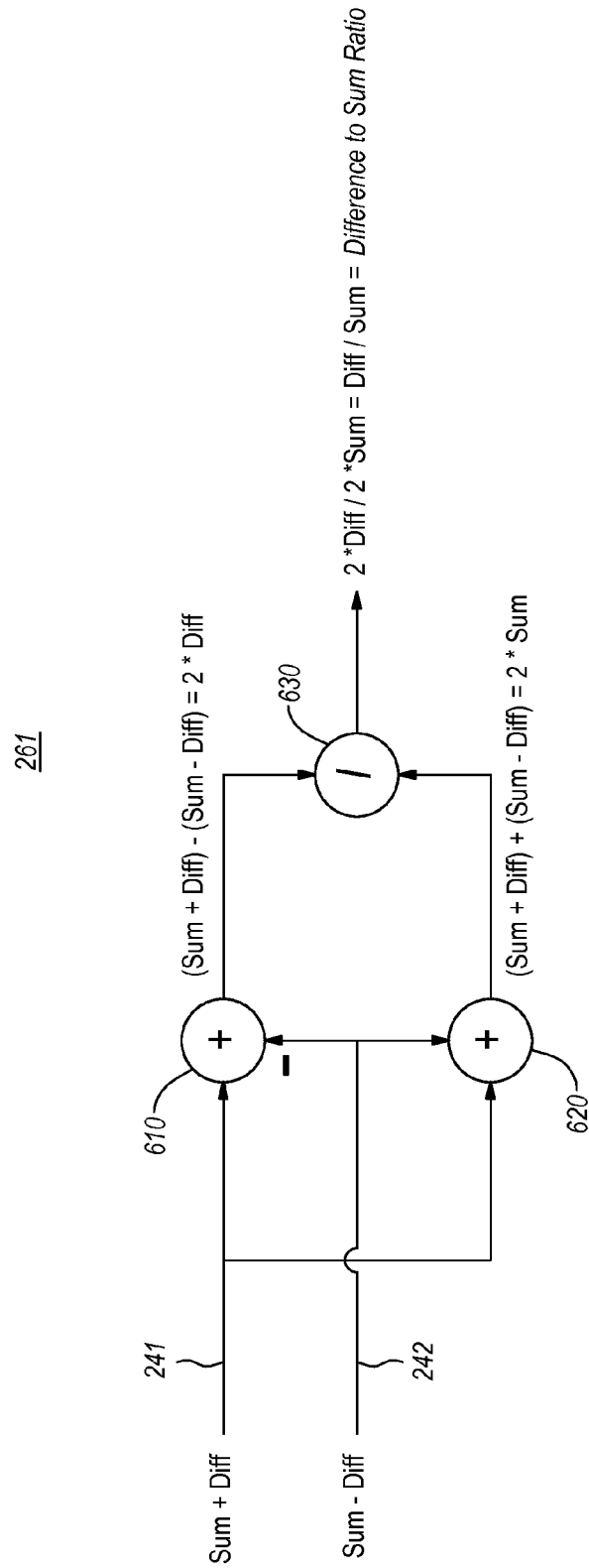
FIG. 6 illustrates an example ratio calculation block according to the embodiments disclosed herein.

FIG. 6 illustrates an embodiment of the azimuth ratio calculation block 261. It will be understood that the elevation calculation block 262 may correspond to the azimuth calculation block 261 and thus need not be explained separately. As illustrated, the azimuth calculation block 261 includes an add block 610 and an add block 620 that receive the sum+difference signal 241 corresponding to arbitrary phase difference $\phi_i$ and the sum−difference signal 242 corresponding to the arbitrary phase difference $\phi_i+\pi$ as previously described. The outputs of the add block 610 and the add block 620 are then provided to a divide block 630 that generates the azimuth difference to sum ratio. It is important to note that because the inputs to calculation block 261 remove the arbitrary phase between the sum and difference channels, the appropriate sign of the azimuth and elevation ratio estimate is automatically generated. This provides the correct direction in azimuth and elevation as well as the correct azimuth and elevation error correction value.

Figure 8:
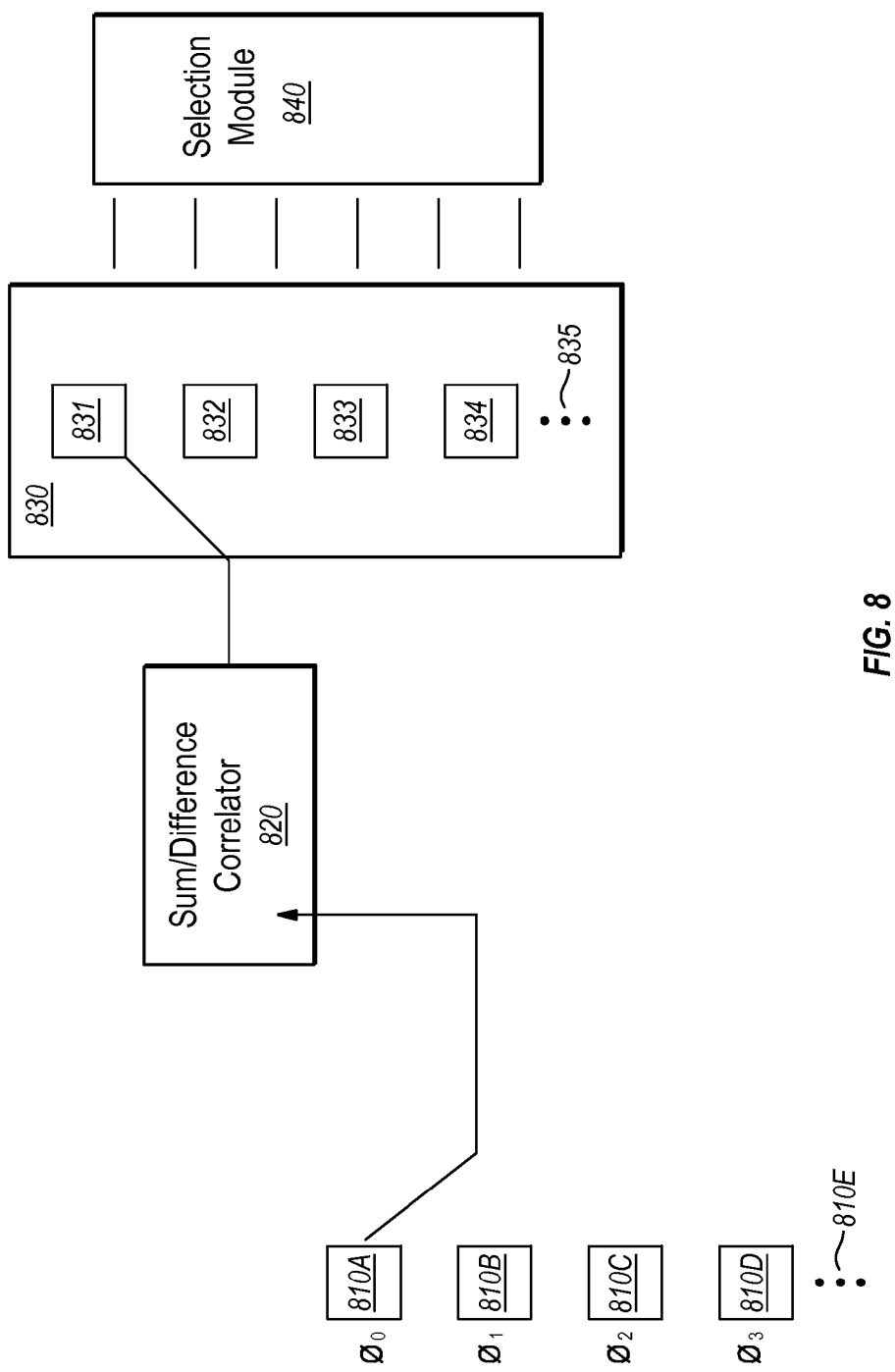
FIG. 8 illustrates an alternative example arbitrary phase detector according to the embodiments disclosed herein.

FIG. 8 illustrates an alternative embodiment 800 of the arbitrary phase detector 140. As shown, the embodiment 800 includes a single sum/difference correlator 820. The sum/difference correlator 820 may correspond to the sum/correlator 220A previously described. Accordingly, a description of the elements of the sum/difference correlator 820 is not included.

The sum/difference correlator 820 receives the sum channel signal 105 and the difference channel signal 106 in the manner described for the sum/correlator 220A. The sum/difference correlator 820 also receives one of a number of potential phase differences 810A, 810B, 810C, 810D, between the sum channel signal and the difference channel signal, with the ellipses 810E representing any number of additional potential arbitrary phase differences. As previously described, the sum channel signal and the difference channel signals may present at the sum/difference correlator 820 different phases due to component mismatch in the receiver 120 and/or due to phase mismatches as the monopulse tracking system 100's position changes relative to the target. In one embodiment, there may be 16 phase pairs as described previously in FIG. 4C.

The sum/difference correlator 820 may correlate the sum+difference signals and sum−difference signals and may estimate a power magnitude of the correlated sum+difference signals and sum−difference signals over a discrete time or integration period in the manner previously described for each sum+difference signal and sum−difference signal. The estimated power magnitudes may then be stored in a memory 830. For example, during a first discrete integration or time period, the sum/difference correlator 820 may correlate the sum+difference signal and sum−difference signal and may estimate a power magnitude of the correlated sum+difference signal and sum−difference signal for the potential arbitrary phase difference 810A. This power magnitude may be stored in the memory at block 831.

Since there is only a single sum/difference correlator 820 in this embodiment, during a second discrete integration or time period, the sum/difference correlator 820 may correlate the sum+difference signal and sum−difference signal and may estimate a power magnitude of the correlated sum+difference signal and sum−difference signal for the potential arbitrary phase difference 820A. This power magnitude may be stored in the memory at block 832.

In like manner, the sum/difference correlator 820 may correlate the sum+difference signal and sum−difference signal and may estimate a power magnitude of the correlated sum+difference signal and sum−difference signal for the remaining potential arbitrary phase differences 810C, 810D, and 810E during discrete time periods. These power magnitudes may be stored in memory 830 at blocks 833, 834, and potentially any number of additional blocks as illustrated by the ellipses 835.

Once a power magnitude has been determined for each of the potential arbitrary phase differences 810, these magnitudes may be fed to a selection module 840, which may correspond to the selection module 240 previously described. The selection module 840 may then determine the power magnitudes of the phase pair that will remove the arbitrary phase difference in the manner previously described.

Although FIG. 8 only shows the single sum/difference correlator 820 for the difference channel 106, it will be appreciated that there may be a second single sum/difference correlator corresponding to sum/difference correlator 230A that receives the sum channel 105 and the difference channel 107. This sum/difference correlator may correlate the sum+difference signal and sum−difference signal and may estimate a power magnitude of the correlated sum+difference signal and sum−difference signal in the manner previously described during discrete periods of time. The power magnitudes may be stored in the memory 830 to be used by the selection module 840.

It will be appreciated that the embodiment of FIG. 8 provides a way to detect and remove an arbitrary phase in a resource constrained environment. That is, even if there are only resources available to implement a single sum/difference correlator, it is still possible to detect and remove arbitrary phase differences in the advantageous manner described herein.

The following discussion now refers to a method and method acts that may be performed. Although the method acts may be discussed in a certain order or illustrated in a flow chart as occurring in a particular order, no particular ordering is required unless specifically stated, or required because an act is dependent on another act being completed prior to the act being performed. Furthermore, the method acts are only provided as examples, and some of the method acts may be optional, combined into fewer method acts, supplemented with further method acts, or expanded into additional method acts without detracting from the essence of the disclosed embodiments.

Figure 7:
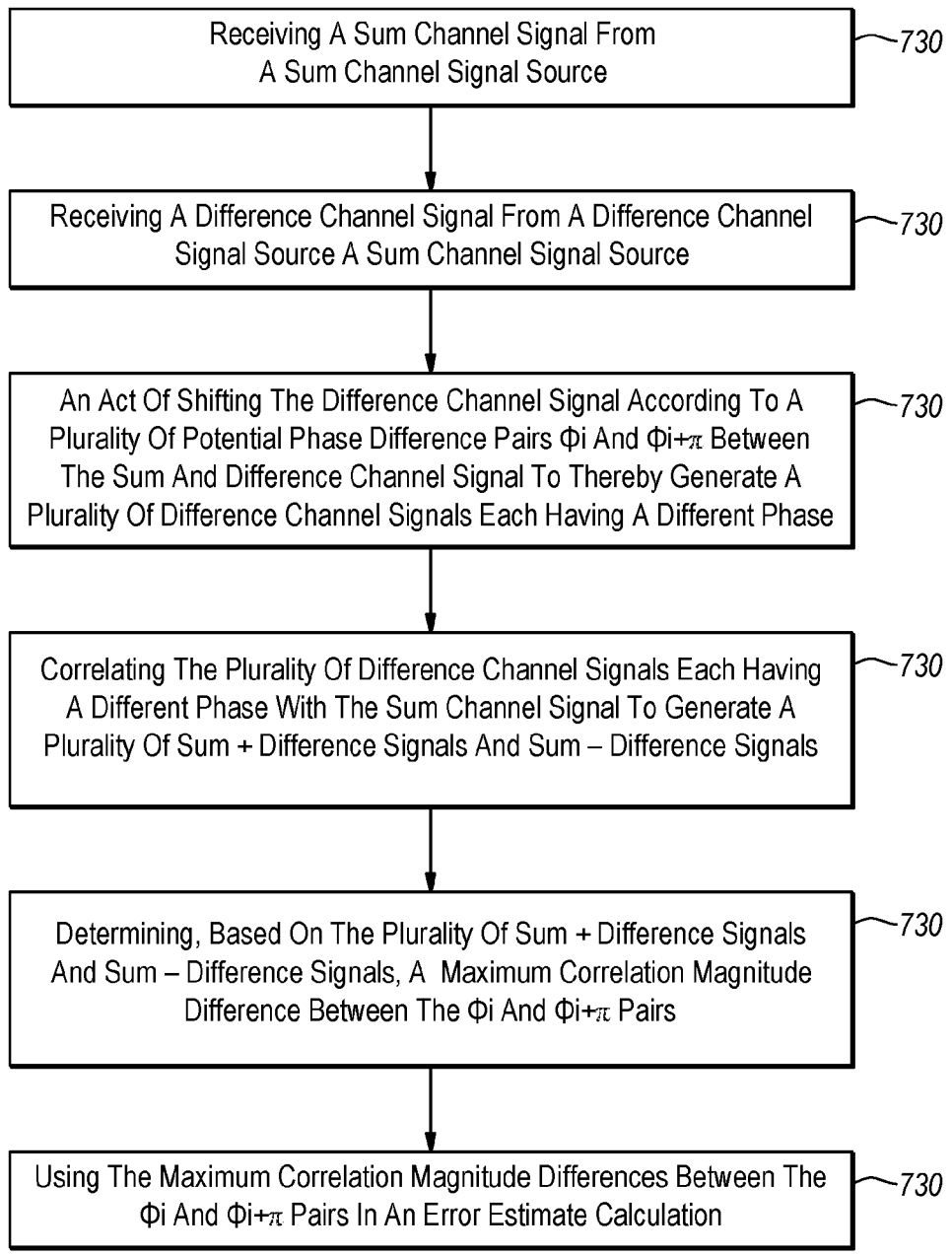
FIG. 7 illustrates a flow chart of a method for detecting an arbitrary phase difference between a sum channel signal and a difference channel signal according to the embodiments disclosed herein.

FIG. 7 illustrates a flow chart of a method 700 for detecting an arbitrary phase difference between a sum channel signal and a difference channel signal. The method includes an act of receiving a sum channel signal from a sum channel signal source (act 710). For example, the arbitrary phase detector 140 may receive the sum channel signal 105 from the receiver 120 and feed/comparator 110 in the manner described in relation to FIGS. 1 and 2. Specifically, the sum channel signal 105 may be received at the first and/or second sets of sum/difference correlators 220 and 230. Alternatively, the sum channel signal 105 may be received at the single sum/difference correlator 820.

The method 700 further includes an act of receiving a difference channel signal from a difference channel signal source (act 720). For example, the arbitrary phase detector 140 may receive the azimuth difference channel signal 106 and/or the elevation difference channel signal from 107 the receiver 120 and feed/comparator 110 in the manner described relation to FIGS. 1 and 2. Specifically, the azimuth difference channel signal 106 may be received at the first set of sum/difference correlators 220. The elevation difference channel signal 107 may be received at the second set of sum/difference correlators 230. Alternatively, the azimuth difference channel signal 106 or the elevation difference channel signal 107 may be received at the single sum/difference correlator 820.

The method 700 further includes an act of shifting the difference channel signal according to a plurality of potential phase difference pairs $\phi_i$ and $\phi_i+\pi$ between the sum and difference channel signals to thereby generate a plurality of difference channel signals each having a different phase (act 730). For example, as previously described in relation to FIGS. 2 and 4A-4C, the first set of sum/difference correlators 220, specifically the multiply block 221 of each of the sum/difference correlators 220, shifts the azimuth difference channel signal 106 according to the potential phase differences 225A, 225B, 225C, 225D and 225E, which correspond to potential arbitrary phase differences $\phi_i$ and $\phi_i+\pi$, (where $\phi_i$ is from 0 to $\pi$ radians, i=0, 1, n; $\phi_i+\pi$ going from $\pi$ to $2\pi$ radians). In the embodiment of FIGS. 2 and 4A-4C, n=7 and this generates 16 phase shifted azimuth difference channel signals.

Likewise, the second set of sum/difference correlators 230, specifically the multiply block 231 of each of the sum/difference correlators 220, shifts the elevation difference channel signal 107 according to the potential phase differences 235A, 235B, 235C, 235D and 235E, which correspond to potential arbitrary phase differences $\phi_i$ and $\phi_i+\pi$, (where $\phi_i$ is from 0 to $\pi$ radians, i=0, 1, n; $\phi_i+\pi$ going from $\pi$ to $2\pi$ radians). In the embodiment of FIGS. 2 and 4A-4C, n=7 and this generates 16 phase shifted elevation difference channel signals.

In addition, in the embodiment of FIG. 8, a multiply block of the sum/correlator 820 shifts either the azimuth difference channel signal 106 or the elevation difference channel signal 107 according to the potential phase differences 810.

The method 700 further includes an act of correlating the plurality of difference channel signals each having a different phase with the sum channel signal to generate a plurality of sum+difference signals and sum−difference signals (act 740). For example, as previously described in relation to FIGS. 2 and 4A-4C, the phase shifted difference channel signals in both the first and/or second sets of sum/difference correlators 220 and 230 are correlated, specifically at the add blocks 222 and 232 of the first and second sets of sum/difference correlators 220 and 230, with the sum channel signal 105. The difference signals that have been shifted by a potential phase difference $\phi_i$ (i.e., phases $\phi_0$-$\phi_7$ shown in FIG. 4C) generate a sum+difference channel signal when correlated with the sum channel signal 105. The difference signals that have been shifted by a potential phase difference $\phi_i+\pi$ (i.e., phases $\phi_0+\pi$-$\phi_7+\pi$ shown in FIG. 4C) generate a sum−difference channel signal when correlated with the sum channel signal 105. As previously described, a similar process is performed in the sum/difference correlator 820.

The method 700 further includes an act of determining, based on the plurality of sum+difference signals and sum−difference signals, a maximum correlation magnitude for the $\phi_i$ and $\phi_i+\pi$ phase pairs (act 750). For example, as previously described in relation to FIGS. 2 and 5, the selection modules 240 and/or 250 may select the sum+difference channel for the azimuth and/or elevation difference signals that has a magnitude corresponding to the potential phase difference $\phi_i$. Likewise, the selection modules 240 and/or 250 may select the sum−difference channel for the azimuth and/or elevation difference signals that has a magnitude corresponding to the potential phase difference $\phi_i+\pi$. As previously discussed, these potential phase differences $\phi_i$ and $\phi_i+\pi$ are likely to correspond to the actual phase differences between the sum channel signal 105, the azimuth difference channel signal 106 and the elevation difference channel signal 107. Accordingly, the magnitudes of the sum+difference signals and the sum−difference signals may be used to remove the phase differences between the sum channel signal 105, the azimuth difference channel signal 106 and the elevation difference channel signal 107.

In some embodiments, the act of determining is done over a defined integration period and is based on an integrated correlation magnitude of the sum+difference channel and the sum−difference channel. For example, as previously described the first and second sets of sum/difference correlators 220 and 230 may include magnitude estimators 223 and 233 and integration blocks 224 and 234 that perform as previously described.

As explained in relation to the embodiments shown in FIG. 2 described above, the acts of shifting, combining, and determining are done in parallel substantially simultaneously. In other words, these acts are done at substantially the same time in each of the first and/or second sets of sum/difference correlators 220 and 230. Advantageously, this allows the embodiments disclosed herein to have very low latency time as all of, or at least a substantial subset of, potential arbitrary phase differences are presented to and evaluated at substantially the same time. Accordingly, the embodiment of FIG. 2 disclosed herein need not wait for discrete time periods to evaluate the set of potential phase differences.

As explained in relation to the embodiment of FIG. 8, the acts of shifting, combining, and determining are done during discrete time periods. That is, the single sum/difference correlator 820 performs these acts on each potential phase difference individually during the discrete time period. The results are then stored in the memory 830.

The method 700 also includes an act of using the maximum correlated magnitudes of the $\phi_i$ and $\phi_i+\pi$ pairs in an error estimate calculation that removes the arbitrary phase difference. For example, as previously described in relation to FIGS. 2 and 6, the processor block 260 and the azimuth ratio calculation block 261 and the elevation ratio calculation block 262 may perform error estimate calculations. The error estimate results or error correction data 265 and 266 include both correction magnitude and direction, and may be provided to the tracking system steering control unit 150 for azimuth and elevation correction as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for an arbitrary phase detector to detect and remove an arbitrary phase difference between a sum channel signal and a difference channel signal, the method comprising:
   an act of the arbitrary phase detector receiving a sum channel signal from a sum channel signal source;
   an act of the arbitrary phase detector receiving a difference channel signal from a difference channel signal source;
   an act of the arbitrary phase detector shifting the difference channel signal according to a plurality of potential phase difference pairs $\phi_i$ and $\phi_i+\pi$ between the sum and difference channel signal to thereby generate a plurality of difference channel signals each having a different phase, wherein the plurality of potential phase difference pairs are virtual phase differences generated by the arbitrary phase detector based on potential phase differences that may be present in the arbitrary phase detector;
   an act of the arbitrary phase detector correlating the plurality of difference channel signals each having a different phase with the sum channel signal to generate a plurality of sum+difference signals and sum−difference signals;
   an act of the arbitrary phase detector determining, based on the plurality of sum+difference signals and sum−difference signals, a maximum correlation magnitude difference between the $\phi_i$ and $\phi_i+\pi$ pairs; and
   an act of the arbitrary phase detector using the maximum correlation magnitude differences between the $\phi_i$ and $\phi_i+\pi$ pairs in an error estimate calculation that removes the arbitrary phase difference.

2. The method according to claim 1, further comprising:
   an act of receiving a second difference channel signal from the difference channel signal source;
   an act of shifting the second difference channel signal according to a second plurality of potential phase difference pairs $\phi_i$ and $\phi_i+\pi$ between the sum and second difference channel signal to thereby generate a plurality of second difference channel signals each having a different phase;
   an act of correlating the second plurality of difference channel signals each having a different phase with the sum channel signal to generate a second plurality of sum+difference signals and sum−difference signals;
   an act of determining, based on the second plurality of sum+difference signals and sum−difference signals, a second maximum correlation magnitude difference between $\phi_i$ and $\phi_i+\pi$ pairs; and
   an act of using the second maximum correlation magnitude differences between $\phi_i$ and $\phi_i+\pi$ pairs in a second error estimate calculation that removes the arbitrary phase difference.

3. The method according to claim 1, wherein the act of shifting the difference channel signal according to the plurality of potential phase difference pairs to thereby generate a plurality of difference channel signals each having a different phase and the act of correlating the plurality of difference channel signals each having a different phase with the sum channel signal are done in parallel substantially simultaneously.

4. The method according to claim 1, wherein the acts of shifting, correlating, and determining are done during discrete time periods.

5. The method according to claim 1, wherein the act of correlating is performed over a specified integration period, wherein the specified integration period is 4 ms.

6. The method according to claim 1, further comprising:
   an act of providing the results of the error estimate calculation for use in steering a monopulse tracking system.

7. The method according to claim 1, wherein the plurality of potential arbitrary phase differences $\phi_i$ and $\phi_i+\pi$ are 22.5 degrees apart across $2\pi$.

8. The method according to claim 1, wherein the method is performed in digital hardware.

9. A phase detector for detecting and removing an arbitrary phase difference between a sum channel signal and a difference channel signal in a monopulse tracking system, the detector comprising:
   a first input configured to receive a sum channel signal from a monopulse tracking system;
   a second input configured to receive a difference channel signal from the monopulse tracking system; and
   one or more sum/difference correlators, the one or more sum difference correlators each coupled to the first and second inputs, each sum/difference correlator comprising:
      a multiply block that receives the difference channel signal and one of a plurality of potential phase difference pairs $\phi_i$ and $\phi_i+\pi$ and shifts the difference signal channel according to the one of the plurality of potential arbitrary phase differences to thereby generate a phase shifted difference channel signal;
      an add block that combines the phase shifted difference channel signal with the sum channel signal to produce one of a sum+difference channel signal or one of a sum−difference channel signal;
      a magnitude estimator block that determines a magnitude of the sum+difference signal or the sum−difference signal;
   a selection block coupled to the one or more sum/difference correlators, the selection block configured to determine the magnitude of the sum+difference signal corresponding to a maximum in-phase correlation from the $\phi_i$ phase shift, and the magnitude of the sum−difference signal corresponding to a maximum out-of-phase correlation from the $\phi_i+\pi$ phase shift; and
   a processor block that uses the magnitude of the sum+difference signal corresponding to the maximum in-phase correlation and the magnitude of the sum−difference signal corresponding to the maximum out-of-phase correlation in an error estimate calculation.

10. The phase detector according to claim 9, further comprising:
    a third input configured to receive a second difference channel signal from the monopulse tracking system;
    a second one or more sum/difference correlators each coupled to the first and second inputs, each second sum/difference correlator comprising:
       a multiply block that receives the second difference channel signal and one of a second plurality of potential arbitrary phase difference pairs $\phi_i$ and $\phi_i+\pi$ and shifts the second difference signal channel according to the one of the second plurality of potential arbitrary phase differences to thereby generate a second phase shifted difference channel signal;

an add block that combines the second phase shifted difference channel signal with the sum channel signal to produce one of a second sum+difference channel signal or one of a second sum−difference channel signal;

a magnitude estimator block that determines a magnitude of the second sum+difference signal or the second sum−difference signal; and a second selection block coupled to the second plurality of sum/difference correlators, the second selection block configured to determine the second sum+difference signal corresponding to a maximum in-phase correlation from the $\phi_i$ phase-shift and the second sum−difference signal corresponding to a maximum out-of-phase correlation from the $\phi_i+\pi$ phase-shift, wherein the processor block uses the second sum+difference signal corresponding to the second maximum in-phase correlation and the second sum−difference signal corresponding to the second maximum out-of-phase correlation in a second error estimate calculation.

11. The phase detector according to claim 10, wherein the processor block performs the first and second error estimate calculations in parallel.

12. The phase detector according to claim 9, further comprising:

a first pre-processing block that perform signal processing on the sum channel signal; and a second pre-processing block that perform signal processing on the difference channel signal.

13. The phase detector according to claim 9, wherein the one or more sum/difference correlators further comprise:

a time integration block that specifies an integration time period over which the magnitude estimator block estimates the magnitude for the sum+difference signal or the sum−difference signal, wherein the integration time period is the same for each of the sum/difference correlators.

14. The phase detector according to claim 13, wherein the specified integration time period is 4 ms.

15. The phase detector according to claim 9, wherein the processor block provides the results of the error estimate calculation for use in steering the monopulse tracking system.

16. The phase detector according to claim 9, wherein the plurality of potential phase difference pairs $\phi_i$ and $\phi_i+\pi$ are 22.5 degrees apart across $2\pi$.

17. The phase detector according to claim 9, wherein the one or more sum/difference correlators operate in parallel substantially simultaneously.

18. A monopulse tracking system, the system comprising:

A feed/combiner comprising two or more feed antennas and two or more combiners, wherein the two or more combiners are configured to combine signals received from the two or more feed antennas to generate a sum channel signal and at least one difference channel signal;

a Radio Frequency (RF) detector assembly that is coupled to the feed/combiner and that receives the sum channel signal and at the least one difference channel signal, the RF detector assembly configured to perform down conversion on the sum channel signal and at the least one difference channel signal and to convert the signals into digital signals; and a digital arbitrary phase detector that is coupled to the RF detector assembly, the digital arbitrary phase detector configured to:

receive the digital sum channel signal from the RF detector assembly;

receive the digital at least one difference channel signal from the RF detector assembly;

shift the at least one difference channel signal according to a plurality of potential arbitrary phase difference pairs $\phi_i$ and $\phi_i+\pi$ between the sum and difference channel signals to thereby generate a plurality of difference channel signals each having a different phase;

combine the plurality of difference channel signals each having a different phase with the sum channel signal to generate a plurality of sum+difference signals and sum−difference signals;

determine, based on the plurality of sum+difference signals and sum−difference signals, a maximum correlation magnitude difference between the $\phi_i$ and $\phi_i+\pi$ pairs; and use the maximum correlation magnitude difference from the $\phi_i$ phase-shift and the $\phi_i+\pi$ phase-shift in an error estimate calculation.

19. The monopulse tracking system according to claim 18, wherein the digital arbitrary phase detector is further configured to:

determine a magnitude for each of the plurality of sum+difference signals and sum−difference signals over a specified integration period.

20. The monopulse tracking system according to claim 19, wherein the specified integration period is 4 ms.

21. The monopulse tracking system according to claim 18, wherein the plurality of potential arbitrary phase differences $\phi_i$ and $\phi_i+\pi$ are 22.5 degrees apart across $2\pi$.

* * * * *